No. 665,738. Patented Jan. 8, 1901.
D. W. HAWKES.
WATER STILL.
(Application filed May 31, 1900.)
(No Model.)

Witnesses.
Lottie M. Hawkes.
Marion Richards.

Inventor.
Daniel W. Hawkes,
by Verrill & Clifford,
Attorneys.

UNITED STATES PATENT OFFICE.

DANIEL W. HAWKES, OF PORTLAND, MAINE.

WATER-STILL.

SPECIFICATION forming part of Letters Patent No. 665,738, dated January 8, 1901.

Application filed May 31, 1900. Serial No. 18,511. (No model.)

*To all whom it may concern:*

Be it known that I, DANIEL W. HAWKES, a citizen of the United States, residing at Portland, in the county of Cumberland and State of Maine, have invented certain new and useful Improvements in Water-Stills; and I do hereby declare the following to be a full, clear, and exact description of the invention, such as will enable others skilled in the art to which it appertains to make and use the same.

My invention relates to improvements in water-stills, and more particularly to portable stills for family use; but the principles involved would be equally applicable to stills of all sizes and for all purposes.

At the present time great attention is being given to the matter of pure water for drinking and household purposes, and my object is to provide a cheap and convenient means for obtaining the same.

Figure 1:
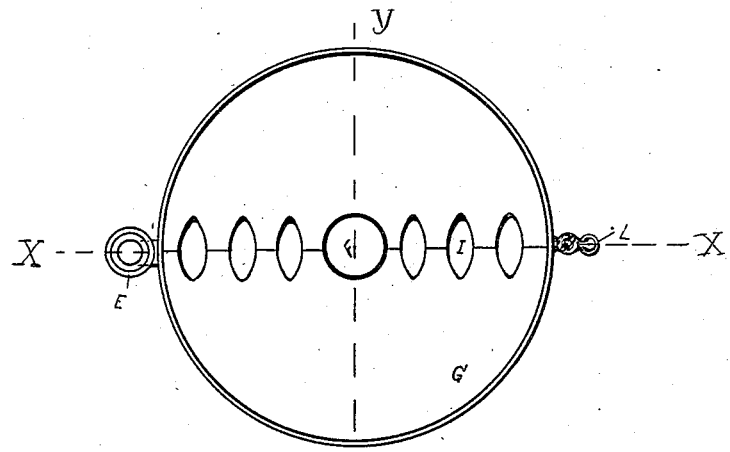
Figure 2:
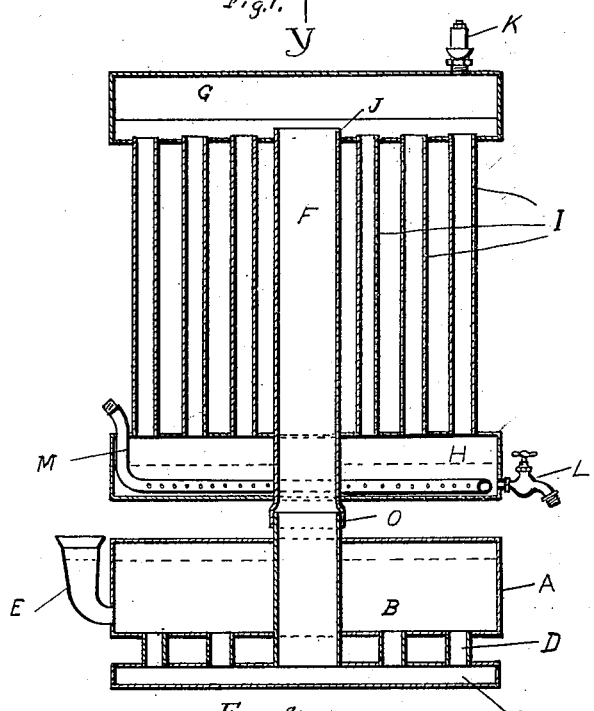
Figure 3:
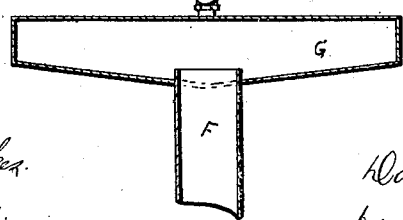

In the drawings herewith accompanying and making a part of this application, Figure 1 is a plan view of my improved still, the top being removed. Fig. 2 is a vertical sectional view taken on line X X of Fig. 1; and Fig. 3 is a central vertical sectional view of the condensing-chamber and a portion of the steam-conduit, taken on line Y Y of Fig. 1.

The same letters of reference refer to like parts.

In said drawings, A represents a reservoir for containing water and in which steam is generated. This reservoir may be of any convenient construction; but I find that the capacity of a given still is greatly increased by dividing said reservoir into upper and lower compartments B and C, respectively, and connecting them by conduits D, the lower compartment C being shallow. The reservoir is provided with a suitable inlet-pipe E, by means of which the reservoir is filled. Leading from said reservoir is a tubular conduit F, opening at the top into a condensing-chamber G. The condensing-chamber is comparatively shallow and of much greater extent than the conduits F and I, entering the bottom thereof, so that the entire surface of the condensing-chamber, except where said conduits enter, is exposed to the air, the air circulating freely around the conduits I and on all sides of the condensing-chamber. Intermediate between the reservoir and said condensing-chamber is a tank H, in which is collected the distilled water. Connecting said condensing-chamber and said tank are a series of conduits I, which serve the double purpose of a conduit for the passage of the water of condensation to the tank and as an addition to the condensing-chamber, thus increasing the efficiency of the apparatus. The chamber receives the initial force of the steam, whence it is distributed through the conduits. It is found useful to make these conduits oval; but this is not necessary.

To direct the water which results from condensation into the conduits and thence into the tank, I incline the bottom of the condensing-chamber downwardly from two sides to a common point coincident with the center line of the conduits leading from the condensing-chamber to the tank.

To prevent any water from returning to the reservoir through the steam-conduit, I extend the top of it above the bottom of the condensing-chamber, as seen at J.

To obviate the danger of an explosion from too great steam-pressure, I insert in the condensing-chamber or at some other convenient point a safety-valve K. The water-tank is provided with a suitable faucet L for drawing off the water.

To many people pure distilled water is not agreeable and needs to be aerated. To properly and conveniently aerate the distilled water, I insert in the tank a perforated pipe M, extending along the bottom of the tank, through which air can be introduced into the water below the surface. The aerating-pipe projects through the top of the tank and terminates in a suitable fixture for the attachment of an air-pump, (not shown,) by means of which air can be forced into said pipe, whence it escapes from the perforations N and passing up through the water thoroughly aerates it.

For convenience in handling the tubular steam-conduit is made in two sections, the point of division being between the reservoir and tank, the two parts telescoping, as seen at O.

To operate my improved still, I introduce a suitable quantity of water into the reservoir and place it upon the stove or other heating apparatus. As soon as the steam begins to generate it passes upwardly through the conduit F into the condensing-chamber, whence it is distributed through the series of conduits I, condensation taking place both in said chamber and upon the walls of said conduits. The water of condensation passes from said chamber and from said conduits into the collecting-tank, whence it may be drawn off through said faucet.

Having thus described my invention and its use, I claim—

1. In a water-still, a steam-generating reservoir having two compartments with connecting conduits, the lower being shallow, a condensing-chamber exposed on all sides to the air, a tubular conduit leading from said reservoir to said condensing-chamber, a collecting-tank intermediate between said reservoir and chamber and tubular conduits connecting said chamber and tank.

2. In a water-still, a steam-generating reservoir, a condensing-chamber, a tubular steam-pipe leading from said reservoir to said chamber, a collecting-tank intermediate between said reservoir and said chamber and tubular conduits connecting said chamber and said tank, the bottom of said chamber inclining downwardly to a common point substantially coincident with the line of the centers of said tubular conduits.

In testimony whereof I affix my signature, in presence of two witnesses, this 29th day of May, 1900.

DANIEL W. HAWKES.

Witnesses:
NATHAN CLIFFORD,
MARION RICHARDS.